Figure 1:
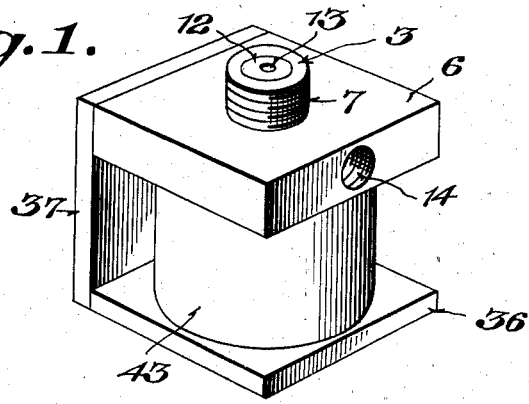

Sept. 15, 1942.  D. C. WISELEY  2,296,132

MAGNETIC CHECK AND RELEASE VALVE

Filed May 15, 1939

Inventor

Don C. Wiseley,

By Andrew T. Dupont his Attorney

Patented Sept. 15, 1942

2,296,132

UNITED STATES PATENT OFFICE 2,296,132

MAGNETIC CHECK AND RELEASE VALVE

Don C. Wiseley, Los Angeles, Calif.

Application May 15, 1939, Serial No. 273,743

4 Claims. (Cl. 137—139)

This invention relates to a magnetically controlled fluid valve adapted to be used in connection with fluid pressure brakes but which is equally capable of general use where it is desired to control flow between a source of fluid and a point of delivery.

The primary object of the invention is to provide a magnetically operated valve between the master cylinder of a fluid brake system and the wheel cylinders such that, normally, the valve will allow unimpeded flow from the master cylinder to the wheel cylinders or vice-versa, but when energized, it will check or prevent flow from the wheel cylinders to the master cylinder, while still permitting flow in the original direction. In its operation, the valve causes fluid pressure to be trapped within the wheel cylinders, holding the brakes in operated position as long as the electric circuit controlling the valve magnet or solenoid remains closed. When this circuit is opened, the valve drops to inoperative position and permits return flow of the pressure fluid from the wheel cylinders to the master cylinder thus releasing the brakes.

Another object of the invention consists in locating the coil winding of the magnetic valve outside the fluid chamber thereby permitting smaller fluid passageways with thinner bounding side walls.

Further objects of the invention lie in that this valve is so built as to reduce the possibilities of leaks and avoid air trapping or pocketing.

Other objects of the invention as well as the many advantages thereof will more fully appear in the following description of the invention taken in conjunction with the accompanying drawing.

Figure 2:
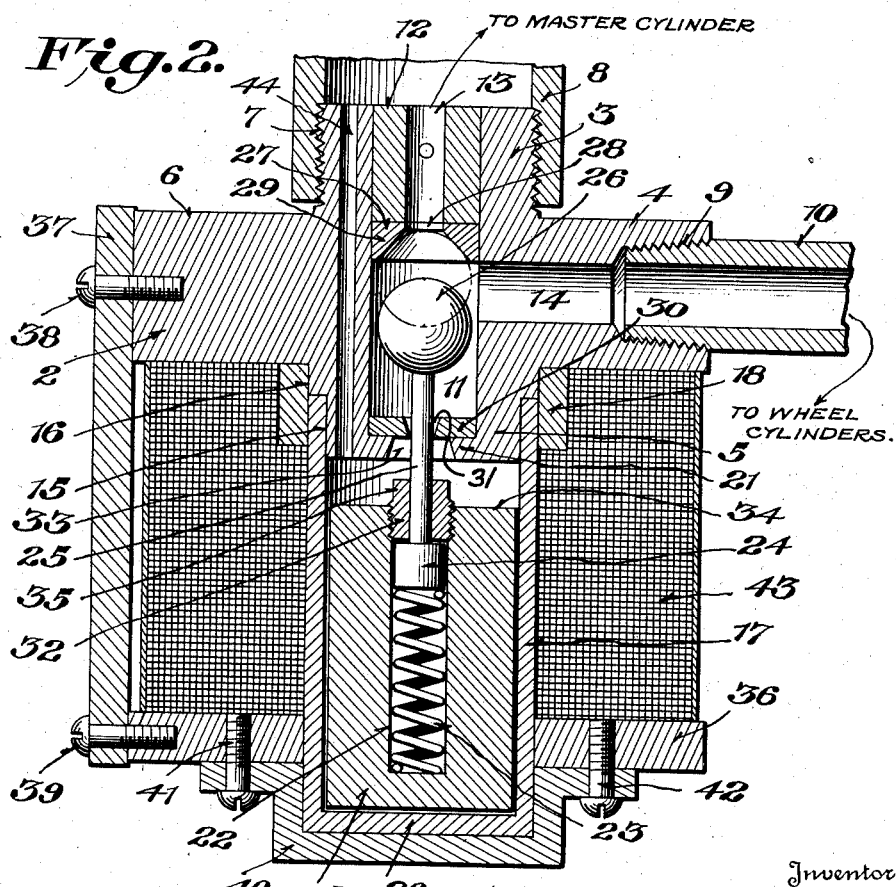

In the drawing:

Figure 1 is a perspective view of the valve as it appears in place on the master cylinder (not shown), and Figure 2 is a sectional elevation thereof.

As illustrated, the valve comprises an iron body 2 provided with extensions 3, 4, 5 and 6. The extension 3 is threaded as shown at 7 to receive a pipe 8 leading to the master cylinder of a hydraulic brake system. The extension 4 is also threaded as at 9 to receive a pipe 10 leading to the usual wheel cylinders. The body 2 is provided with an axial chamber 11 at the upper end of which is fitted a bushing 12 having a bore 13 therethrough so that, normally, communication is established from pipe 8 to chamber 11. A passage 14 is cut longitudinally through the extension 4 so as to provide a fluid path from pipe 10 to chamber 11.

The extension 5 has stepped portions 15 and 16 as shown for the purpose of receiving a cylindrically shaped brass cup 17 and a tightly fitted clamping ring 18, respectively, the said clamping ring serving to maintain the cup 17 in position. A cylindrical iron plunger 19 is loosely fitted within the cup and is adapted to have reciprocating movement therein between the bottom 20 of the cup 17 and the bottom wall 21 of extension 5. Plunger 19 has an axial bore 22 in which a helical spring 23 is housed. While the lower end of this spring rests on the bottom wall of bore 22, the upper end thereof abuts against a piston head 24 integral with rod 25 which extends into chamber 11. The free end of rod 25 supports a free ball valve 26 operating in the said chamber 11. A rubber gasket 27, having a central opening 28 coinciding with bore 13 or bushing 12 and conical side walls 29 to receive ball valve 26 when in closed position, is fitted within chamber 11, against bushing 12, as illustrated. At the lower end of chamber 11 another rubber gasket 30 is mounted on the bottom wall 21 of extension 5 and has an opening 31 therethrough to accommodate free sliding movement of valve rod 25.

The axial bore 22 of plunger 19 is closed by a brass screw plug or bushing 32 having a through opening to guide the valve rod 25. The outside diameter of bushing 32 is the same as the diameter of the opening 33 through the bottom wall 21 of extension 5 and the bushing extends above the upper face 34 of plunger 19 as shown at 35, a distance sufficient to close the opening 33 when the plunger reaches its upper position.

An iron spool end 36 is fitted around the brass cup 17 and an iron yoke 37 is supported on extension 6 and on the said spool end 36 by means of bolts 38 and 39. Around the lower extremity of brass cup 17 is a brass, reinforcing, dish-shaped ring 40 secured to the spool end 36 by means of bolts 41 and 42.

The body 2, brass cup 17 and spool end 36 form a spool upon which an electro-magnet coil winding 43 is wound, the terminals of which are connected to a suitable source of electric energy.

It will be noted that the iron body 2 has a lateral passage 44 therethrough, offset from chamber 11 and extending from the connection of the body with pipe 8 down to cup 17. The purpose and function of this passage 44 will appear later.

The operation of the device is as follows:

In normal or unoperated position the solenoid 43 is deenergized, plunger 19 is resting at the bottom of cup 17, valve rod 25 is in its downward position and the ball valve 26 is clear of its seat 29. In this position flow of pressure fluid from the master cylinder, through pipe 8, bore 13, chamber 11, passage 14 and pipe 10 is unimpeded and the fluid may pass freely from the master cylinder to the wheel cylinders and vice-versa. The fluid is also bypassed from pipe 8 through passage 44, cup 17, opening 33, clearance around valve rod 25, to chamber 11, so that pressure fluid acts practically on all sides of ball valve 26.

When the solenoid 43 is energized plunger 19 is moved upwardly in cup 17, carrying with it the valve rod 25 due to the pressure of the spring 23 against piston head 24. Ball valve 26 is then forced against its seat 29 closing communication between bore 13 and chamber 11. The net result of this operation is to prevent pressure fluid from backing up from the wheel cylinders, through pipe 10, passage 14, chamber 11, bore 13, pipe 8, to the master cylinder. Consequently, the brakes are set and since no fluid can exhaust from the wheel cylinders, the brakes can not loosen and must, perforce, remain in applied position. However, at this time, it is still possible to admit pressure fluid from the master cylinder to the wheel cylinders since pressure fluid from the master cylinder can force ball valve 26 away from its seat against the pressure of the spring 23.

When the parts assume the position presently described for brake setting, with valve 26 on its seat 29, it will be noted that since the plunger 19 has moved upwardly as far as it can go, the projection 35 on bushing 32 has entered and completely closed the opening 33 of bottom wall 21. Consequently, by-passing of the fluid from the master cylinder, through passage 44 to chamber 11 has ceased.

When the solenoid 43 is deenergized, plunger 19 drops to the bottom of cup 17 and communication is reestablished from the master cylinder, through pipe 8, passage 44, cup 17, opening 33, clearance around valve rod 25, to chamber 11. Hence, pressure is again balanced on opposite sides of ball valve 26 and the latter is free to drop on the valve rod 25 thus reestablishing free and unimpeded flow from the master cylinder to the wheel cylinders and vice versa.

Having thus set forth my invention, I claim as new and desire to secure by Letters Patent:

1. A valve device of the kind described comprising a body having pressure fluid inlet and outlet, a port between said inlet and outlet, a valve for controlling said port, a cup member, an annular electro-magnetic coil around said cup member, a spool end at one end of said coil surrounding said cup member, a yoke between said body and said spool end, a plunger in said cup forming the armature for said electro-magnetic coil, a yieldable connection between said plunger and said valve and a dished ring, secured to said spool end in which the bottom of said cup member is nested.

2. A valve device as set forth in claim 1 wherein the yieldable connection between the plunger and the valve comprises a spring housed in an opening in said plunger, a piston resting against one end of said spring and a rod integral with said piston and abutting the ball valve.

3. A valve device comprising a body having pressure fluid ports and a valve chamber, passages between said ports and said chamber, a valve in the chamber controlling said passages, a cup-shaped member secured to said body in alignment with the chamber, separating means between the chamber and the cup-shaped member, there being an opening in said separating means, a hollow plunger in said cup-shaped member, a normally biased piston therein, a piston rod extending therefrom through the opening and into said chamber and detachably engageable with said valve, there being clearance space around said piston rod about the opening, a channel leading from one of said ports to the cup-shaped member, electro-magnetic means controlling said cup-shaped member, and means carried by said plunger for controlling said channel.

4. A valve device of the kind described comprising a body having pressure fluid inlet and outlet, a port between said inlet and outlet, a valve for controlling said port, a hollow plunger, electro-magnetic means for operating said plunger, a connection between said plunger and said valve comprising a piston in said hollow plunger and a piston rod extending therefrom and detachably engageable with said valve, a by-pass from the inlet to the valve, and means on said plunger to control said by-pass.

DON C. WISELEY.